US012741656B2

(12) United States Patent
Fatemi Dezfouli et al.

(10) Patent No.: US 12,741,656 B2
(45) Date of Patent: Sep. 22, 2026

(54) MONITORING PLATFORM FOR A SENSOR FUSION SYSTEM

(71) Applicant: ZENSEACT AB, Gothenburg (SE)

(72) Inventors: Maryam Fatemi Dezfouli, Gothenburg (SE); Benjamin Eliassen Lundahl, Gothenburg (SE); Andreas Nykvist, Gothenburg (SE); Mohammad Ali, Bohus (SE)

(73) Assignee: ZENSEACT AB, Gothenburg (SE)

( * ) Notice: Subject to any disclaimer, the term of this patent is extended or adjusted under 35 U.S.C. 154(b) by 85 days.

(21) Appl. No.: 18/816,585

(22) Filed: Aug. 27, 2024

(65) Prior Publication Data

US 2025/0074436 A1 Mar. 6, 2025

(30) Foreign Application Priority Data

Aug. 29, 2023 (EP) .................................... 23193974

(51) Int. Cl.
*B60W 50/02* (2012.01)

(52) U.S. Cl.
CPC . *B60W 50/0205* (2013.01); *B60W 2050/0215* (2013.01)

(58) Field of Classification Search
CPC .................. B60W 50/0205; B60W 2050/0215
See application file for complete search history.

(56) References Cited

U.S. PATENT DOCUMENTS 11,479,262 B2 * 10/2022 Harrison ................ G01S 13/87
2016/0356594 A1 * 12/2016 Sorenson ............... G08G 1/161
2017/0219338 A1 * 8/2017 Brown ................... G01B 11/22
2019/0293772 A1 * 9/2019 Pfeiffer .................. G01S 17/42
2020/0049511 A1 2/2020 Sithiravel et al.
2020/0339151 A1 * 10/2020 Batts ................... B60W 50/029
2021/0103027 A1 * 4/2021 Harrison .................. G01S 7/40
2021/0249047 A1 8/2021 Levinson et al.
2022/0348211 A1 11/2022 Hofbauer et al.

(Continued)

FOREIGN PATENT DOCUMENTS

JP 10112000 A 4/1998

OTHER PUBLICATIONS

Extended European Search Report mailed Feb. 14, 2024 for European Patent Application No. 23193974.5, 18 pages.

*Primary Examiner* — Hussein Elchanti
(74) *Attorney, Agent, or Firm* — Sage Patent Group

(57) ABSTRACT

A method for monitoring a reliability of an output of a sensor fusion system of a vehicle is disclosed. At first, an input data, including sensor data obtained over a period of time from each of vehicle-mounted sensors, which are configured to monitor a surrounding environment of the vehicle, of the sensor fusion system is stored. Perception output data that is output from the sensor fusion system, includes object detections and free-space area indications in the surrounding environment of the vehicle. The obtained perception output data is then compared with the stored input data and determined whether any object detections indicated in the obtained perception output data is indicated in the field-of-view of that sensor in order to validate any object detections and free-space area indications in the obtained perception output data. Accordingly, a signal indicative of a status of the sensor fusion system is outputted.

12 Claims, 5 Drawing Sheets

(56) References Cited

U.S. PATENT DOCUMENTS

| | | | | |
|---|---|---|---|---|
| 2022/0393341 | A1* | 12/2022 | Shams | H01Q 21/28 |
| 2022/0398851 | A1 | 12/2022 | Nehmadi et al. | |
| 2023/0054590 | A1 | 2/2023 | Backhouse et al. | |
| 2023/0409668 | A1* | 12/2023 | Wang | G06F 17/17 |

* cited by examiner

MONITORING PLATFORM FOR A SENSOR FUSION SYSTEM

CROSS-REFERENCE TO RELATED APPLICATIONS

The present application for patent claims priority to European Patent Office Application Ser. No. 23193974.5, entitled "A MONITORING PLATFORM FOR A SENSOR FUSION SYSTEM" filed on Aug. 29, 2023, assigned to the assignee hereof, and expressly incorporated herein by reference.

TECHNICAL FIELD

The disclosed technology relates to monitoring a reliability of a sensor fusion system. In particular, but not exclusively the disclosed technology relates to a method and a system for monitoring a reliability of an output of a sensor fusion system of a vehicle, such as the perception output data generated by the sensor fusion system.

BACKGROUND

During these last few years, the development of autonomous vehicles has exploded and many different solutions are being explored. An increasing number of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, development is ongoing in both ADAS as well as Autonomous Driving (AD), within a number of different technical areas within these fields. ADAS and AD will herein be referred to under the common term Automated Driving System (ADS) corresponding to all of the different levels of automation as for example defined by the SAE J3016 levels (0-5) of driving automation.

Accordingly, in a not too distant future, ADS solutions will to a greater extent find their way into modern vehicles. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles and/or relevant signage.

Vehicle perception systems play an important role in ADS in order to ensure reliable and safe vehicle operation. Perception systems can in the present context be understood as systems responsible for acquiring raw sensor data from on-vehicle sensors such as cameras, LIDAR, and RADAR, and converting this raw data into scene understanding for the vehicle. Furthermore, perception systems generally include one or more sensor fusion systems (e.g., object tracking modules) that are configured to process multiple types of sensor outputs with the aim of providing a more complete perception output and consequently, a better understanding of the surrounding environment. The output from a sensor fusion system is generally consumed by various ADS functions responsible for control or operation of the vehicle. Therefore, it is important to be able to provide sensor fusion systems that are capable of providing a reliable and accurate scene understanding of the surrounding environment of the vehicle, since the quality of the information provided by the sensor fusion modules affects the vehicle's perception capability significantly, and in extension the performance and safety of various ADS functions.

Accordingly, there is still a need in the art for methods and systems capable of ensuring the reliability of the performance of the ADS's perception system and in extension, the overall performance and safety of the ADS.

SUMMARY

The herein disclosed technology seeks to mitigate, alleviate or eliminate deficiencies and disadvantages in the prior art to address various problems relating to ensuring safe operation of various functions of Automated Driving Systems.

It is therefore an object of the herein disclosed technology to provide a computer-implemented method, a computer-readable storage medium, a computer program product, a system, and a vehicle that alleviate all or at least some of the drawbacks of presently known systems and methods.

Further, it is an object of the herein disclosed technology to provide a computer-implemented method, a computer-readable storage medium, a computer program product, a system, and a vehicle that provide a means for ensuring that the output from the sensor fusion system is accurate and reliable in order to ensure adequate performance of ADS functions that are reliant on the output from a sensor fusion system, and to improve the overall road safety for ADS-equipped vehicles.

Various aspects and embodiments of the herein disclosed technology are defined below and in the accompanying independent and dependent claims.

A first aspect of the disclosed technology comprises a computer-implemented method for monitoring a reliability of an output of a sensor fusion system of a vehicle. The sensor fusion system is configured to receive input data and generate perception output data. The input data comprises sensor data, obtained over a time period, from each of a plurality of vehicle-mounted sensors configured to monitor a surrounding environment of the vehicle, and the method comprises storing said input data of the sensor fusion system. The method further comprises obtaining perception output data that is output from the sensor fusion system using the input data obtained over the time period. The obtained perception output data comprises one or more object detections in the surrounding environment of the vehicle and one or more free-space area indications in the surrounding environment of the vehicle. For each sensor or subset of sensors of the plurality of vehicle-mounted sensors, the method comprises comparing the obtained perception output data with the stored input data and determining whether any object detections indicated in the obtained perception output data is/are indicated in the field-of-view of that sensor or subset of sensors in order to validate any object detections indicated in the obtained perception output data, and whether any free-space area indications in the obtained perception output data is/are indicated in the field-of-view of that sensor or subset of sensors in order to validate any free-space area indicated in the obtained perception output data. Furthermore, the method comprises outputting a signal indicative of a status of the sensor fusion system based on a measure of validated objects and a measure of validated free-space areas.

Accordingly, there is provided a solution for monitoring the output of a sensor fusion system of a vehicle. In more detail, the herein disclosed approach enables for validation of the objects and free-space areas in the environment around the vehicle as indicated in the output of the sensor fusion system of a perception function/system of the vehicle. The validations are then used to indicate the status of the sensor fusion system. By signaling an indication of a status of the sensor fusion system, the accuracy of the sensor fusion system output can be assessed and further actions can be taken. For example, if the sensor fusion system appears to be failing, a suitable function of the ADS can act accordingly to autonomously perform a suitable action due to this failure (e.g., stopping the vehicle or requesting a hand-over to a driver of the vehicle). Alternatively, the ADS or the perception system thereof may switch to use a secondary sensor fusion system, if such a redundancy exists. For example, if one or more of the sensors provides sensor data, indicating the presence of an object or group of objects and/or free-spaces in the environment of the ego-vehicle, and which does not match the output data of the sensor fusion system, an autonomous vehicle may take actions based on the defined inconsistency. Thus, the reliability of information in regards to the environment through which the vehicle is travelling is improved, thus providing overall road safety for ADS-equipped vehicles.

A second aspect of the disclosed technology comprises a computer program product comprising instructions which, when the program is executed by a computing device of a vehicle, causes the computing device to carry out the method according to any one of the embodiments disclosed herein. With this aspect of the disclosed technology, similar advantages and preferred features are present as in the previously discussed aspects.

A third aspect of the disclosed technology comprises a (non-transitory) computer-readable storage medium comprising instructions which, when executed by a computing device of a vehicle, causes the computing device to carry out the method according to any one of the embodiments disclosed herein. With this aspect of the disclosed technology, similar advantages and preferred features are present as in the previously discussed aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

A fourth aspect of the disclosed technology comprises a system for monitoring a reliability of an output of a sensor fusion system of a vehicle, wherein the sensor fusion system is configured to receive input data and generate perception output data. The system comprises one or more memory storage areas comprising program code. The one or more memory storage areas and the program code are configured to, with the one or more processors, cause the system to at least store input data of the sensor fusion system, wherein the input data comprises sensor data, obtained over a time period, from each of a plurality of vehicle-mounted sensors configured to monitor a surrounding environment of the vehicle, and obtain perception output data that is output from the sensor fusion system using the input data obtained over the time period, the obtained perception output data comprising one or more object detections in the surrounding environment of the vehicle and one or more free-space area indications in the surrounding environment of the vehicle. Then, the one or more memory storage areas and the program code are configured to, with the one or more processors, cause the system to, for each sensor or subset of sensors of the plurality of vehicle-mounted sensors, compare the obtained perception output data with the stored input data and determine whether any object detections indicated in the obtained perception output data is/are indicated in the field-of-view of that sensor or subset of sensors in order to validate any object detections indicated in the obtained perception output data, and whether any free-space area indications in the obtained perception output data is/are indicated in the field-of-view of that sensor or subset of sensors in order to validate any free-space area indicated in the obtained perception output data. Furthermore, the one or more memory storage areas and the program code are configured to, with the one or more processors, cause the system to output a signal indicative of a status of the sensor fusion system based on a measure of validated objects and a measure of validated free-space areas. With this aspect of the disclosed technology, similar advantages and preferred features are present as in the previously discussed aspects.

A fifth aspect of the disclosed technology comprises a vehicle comprising a system according to any one of the embodiments disclosed herein. With this aspect of the disclosed technology, similar advantages and preferred features are present as in the previously discussed aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

An advantage of some embodiments is that any potential limitations of the sensor fusion system may be caught in a timely manner and potential negative effects on the performance or safety of the ADS may be mitigated.

An advantage of some embodiments is that there is provided a robust solution for monitoring the reliability of an output of a sensor fusion system of the vehicle, thereby allowing for precautionary measures to be executed on the basis of the status of the sensor fusion system so to reduce the risk of incidents caused by erroneous outputs from the sensor fusion system.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

The herein disclosed technology will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general-purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

Figure 1:
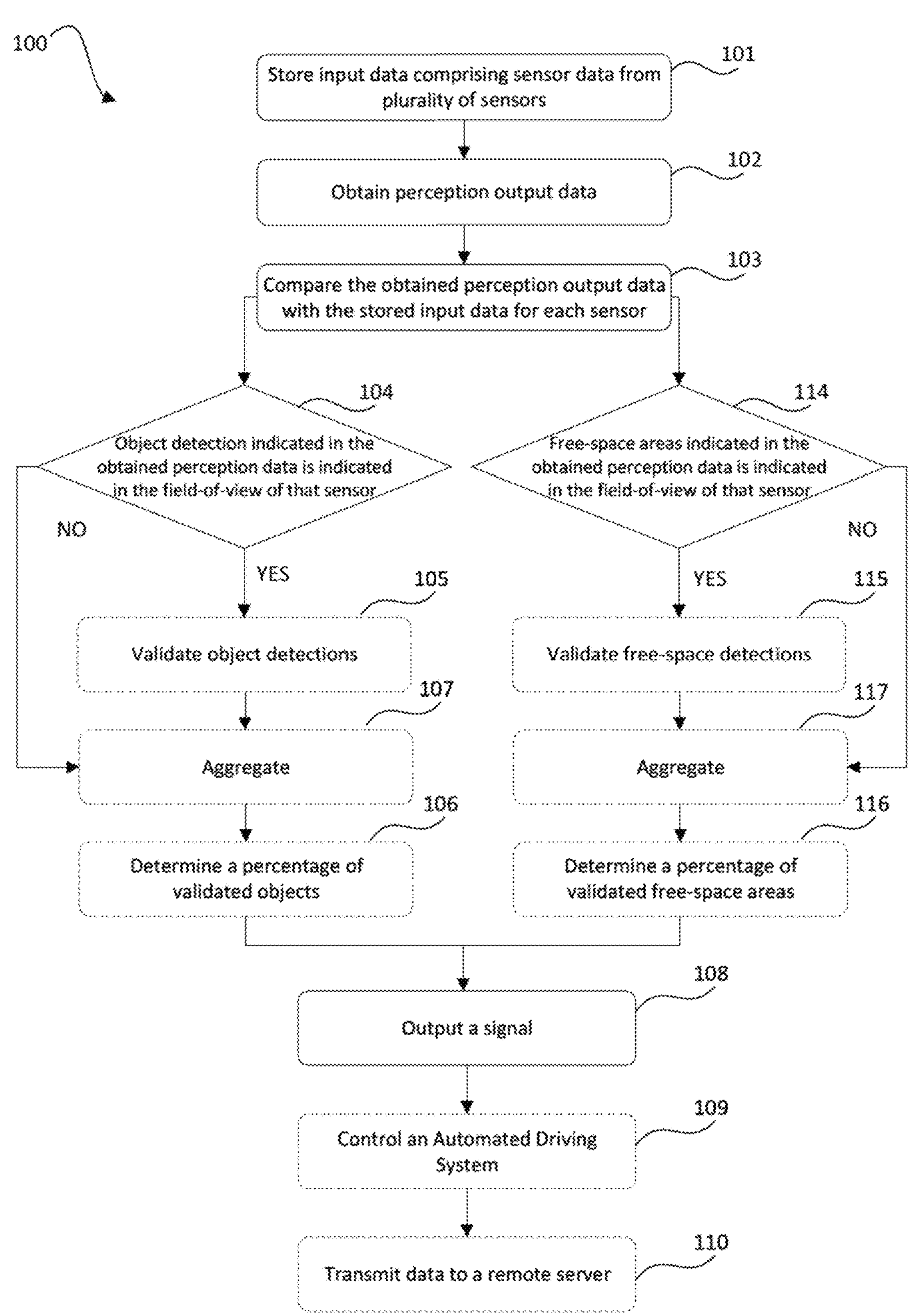
FIG. 1 is a schematic flow chart of a method for monitoring a reliability of an output of a sensor fusion system of a vehicle in accordance with some embodiments.

FIG. 1 illustrates a schematic flow chart representation of a method 100 for monitoring the reliability of an output of a sensor fusion system of a vehicle. The method 100 is preferably a computer-implemented method 100, performed by a processing system of the ADS-equipped vehicle. The processing system may for example comprise one or more processors and one or more memories coupled to the one or more processors, wherein the one or more memories store one or more programs that cause the processing system to perform the steps, services and functions of the method 100 disclosed herein when executed by the one or more processors.

In general, sensor fusion technique, i.e., combining the output of multiple sensors, may be utilized for various purposes in the context of Automated Driving Systems. For example, output data from multiple on-board sensors (GNSS, LiDARs, RADARs, and cameras) may be fused to track other vehicles, detect static obstacles, and localize the ego-vehicle relative to a road model. In some embodiments, the sensor fusion system is an object-tracking system configured to track a position of objects present in the input data (i.e. the sensor data) over time.

The method 100 comprises storing 101 input data of the sensor fusion system. The input data comprises sensor data, obtained over a time period, from each of a plurality of vehicle-mounted sensors configured to monitor a surrounding environment of the vehicle. The surrounding environment of the vehicle can be understood as a general area around the ego-vehicle in which objects (such as other vehicles, landmarks, obstacles, etc.) can be detected and identified by vehicle sensors (radar, LIDAR, cameras, etc.), i.e., within sensor range of the ego-vehicle. The sensor data from each sensor is indicative of the surrounding environment of the vehicle, or at least parts thereof. Thus, the sensor data may be data obtained from one or more RADARs, one or more LIDARs, one or more cameras, or any other suitable vehicle-mounted sensor as known in the art.

The input data may, for example, be stored 101 or saved in a data buffer (not shown), where this input data may be understood as information indicative of the vehicle's surroundings. Input data may comprise processed sensor data and/or unprocessed (raw) sensor data. For example, camera images may be post-processed while LIDAR output (point clouds) may be fed directly as input to the sensor fusion system. In some embodiments, the sensor data is in the form of a list of objects and their attributes (e.g., position or location in surrounding environment of the vehicle, type of object, etc.). In the context of the present disclosure, "objects" may be understood as physical objects or obstacles present in the environment around the ego-vehicle. Further, the sensor data may be derived continuously and/or intermittently from a first point in time T1 to a second point in time T2. The time period—and correspondingly the length of the optional data buffer—may be of any arbitrary size deemed feasible, e.g., in consideration of data capacity restraints and/or characteristics of the ADS, and may for instance range from under a second up to several minutes, or more preferred, from a few seconds up to less than a minute.

Further, the method 100 comprises obtaining 102 perception output data. The perception output data is output from the sensor fusion system using the input data obtained over the time period. This implies that the perception output data is generated by processing the sensor data that has been output by the vehicle-mounted sensors and that has been acquired during the aforementioned time period and stored in a suitable data storage medium (e.g., data buffer). In other words, the input data may be simultaneously stored by a suitable data storage medium, while the input data is consumed by the sensor fusion system to provide the perception output data. The obtained perception output data comprises one or more object detections in the surrounding environment of the vehicle. The obtained perception output data further comprises one or more free-space area indications in the surrounding environment of the vehicle. In some embodiments, the free-space area indications may simply be construed as areas on which no object detections have been made, i.e., indirect indications. However, in some embodiments the free-space area indications may be direct indications, i.e. areas in the surrounding environment of the vehicle that have been explicitly indicated or classified as free-space areas.

Furthermore, the term "obtaining" is herein to be interpreted broadly and encompasses receiving, retrieving, collecting, acquiring, and so forth directly and/or indirectly between two entities configured to be in communication with each other or further with other external entities. However, in some embodiments, the term "obtaining" is to be construed as determining, deriving, forming, computing, etc.

The term "perception output data" may be construed as the information generated from fusing the output from various (at least two) sensors of the vehicle. The output from various sensors includes data collected from cameras, LIDAR, radar, and/or other sensors that help the vehicle "perceive" its surroundings and make decisions based on that information. The perception output data generated by the sensor fusion system may include the position, speed, and direction of nearby objects, position and type of road markings, position and type of traffic signs, position and extension of free-space areas, and other relevant information. This data may then be processed by the vehicle's onboard computer (and in particular by various ADS functions) as input to make decisions on steering, acceleration, braking, and other actions necessary to safely navigate the environment. Accordingly, the term "perception output" data may refer to "surroundings assessment" data, "spatial perception" data, "processed sensory" data and/or "temporal dependencies" data, whereas perception "data" may refer to perception "information" and/or "estimates". The term "obtained" from a sensor fusion system, on the other hand, may refer to "derived" from a sensor fusion model and/or "based on output data" from a sensor fusion or system, whereas a perception fusion module/system configured to "generate the perception output data" may refer to a perception module/system adapted and/or configured to "estimate the surroundings of said vehicle", "estimate at least a portion of the surroundings of said vehicle", "determine the surroundings of said vehicle", "interpret sensory information relevant for the autonomous manoeuvering of said vehicle", and/or "estimate the surroundings of said vehicle and make model predictions of future states of the surroundings of said vehicle".

Thus, the term "perception output data" is to be understood as a term encompassing various estimations of e.g. one or more of object positions, object classifications, lane markings, object trajectory predictions, or free-space estimations. As mentioned, free-space estimations may be understood as a determination of free-space areas i.e., estimates of areas absent of external objects (static and dynamic objects). One can consider an estimation of "driveable area" in an analogous fashion, where in addition to the estimation of areas absent of objects (as in the case of free space) the "driveable area" estimation also includes the presence of a road surface.

Moving on, the method 100 comprises, for each sensor or subset of sensors of the plurality of vehicle-mounted sensors, comparing 103 the obtained perception output data with the stored input data of the sensor fusion system. The comparison may be performed on a per-sensor basis such that each one of the vehicle-mounted sensor's input data is compared with the perception output data. Additionally or alternatively, the comparison may be performed on a groupwise sensor basis such that one subset of the vehicle-mounted sensor's input data is compared with the perception output data. The subset of sensors may be grouped based on sensor modality. For example, one or more RADARs may be a first subset of vehicle-mounted sensors, while one or more LIDARs may be a second subset of vehicle-mounted sensors. One or more cameras may be grouped as a third subset of vehicle-mounted sensors. In some embodiments, the storing 101 of input data comprises separately storing each dataset of the input data in a respective sensor-specific or subset-specific data storage.

Furthermore, the method 100 comprises, for each sensor or subset of sensors of the plurality of vehicle-mounted sensors, determining 104 whether any object detections indicated in the obtained perception output data is/are indicated in the field-of-view of that sensor or subset of sensors in order to validate any object detections indicated in the obtained perception output data. Stated differently, the method 100 comprises, for each sensor or subset of sensors of the plurality of vehicle-mounted sensors, determining 104 whether any object detection(s) of the perception output data is/are indicated in the sensor data output by that sensor or subset of sensors in order to validate the one or more object detections indicated in the obtained perception output data.

Moreover, for each sensor or subset of sensors of the plurality of vehicle-mounted sensors, the method comprises determining 114 whether any free-space area indications in the obtained perception output data is/are indicated in the field-of-view of that sensor or subset of sensors in order to validate any free-space area indicated in the obtained perception output data. Stated differently, the method 100 comprises, for each sensor or subset of sensors of the plurality of vehicle-mounted sensors, determining 114 whether any free-space area indications of the perception output data is/are indicated in the sensor data output by that sensor or subset of sensors in order to validate the one or more free-space areas indicated in the obtained perception output data. In some embodiments, this determination 114 may be construed as a "negative confirmation", i.e. checking if any object detections indicated in the sensor data output by that sensor are located in a free-space area indicated in the perception output data. In such a case where an object detection in the sensor data output is located in a free-space area indicated in the perception output data, the free-space area indicated in the perception output data would not be a validated free-space area indication.

In general, for any object detection or free-space area indication in the perception output data, there is always at least one vehicle-mounted sensor whose output can be used to validate that object detection or free-space area indication that is indicated in the obtained perception output data.

Accordingly, the object detections indicated in the obtained perception output data and the free-space area indicated in the obtained perception output data are validated against the sensor output data. In other words, the comparison 103 of the obtained perception output data with the stored input data may be understood as a process of checking if the object detections and free-space indications (i.e., areas absent of objects) can be verified in the sensor data output by one or more of the vehicle-mounted sensors. More specifically, the process may be understood as a review of all object detections and free-space area indications in the perception output data in view of the stored input data. So, on a per-sensor basis or per-subset-of-sensor basis, all object detections and free-space area indications in the perception output data are assessed in order to verify each of the object detections and free-space area indications. The term "field-of-view" of a sensor may in the present context be understood as the volume within which a specific sensor can make detections. This may also be referred to as a viewing frustum of a sensor. Moreover, objects may either be directly present in the stored input data, or otherwise indicated in the stored input data. For example, the input data in the form of a LIDAR output generally contains point clouds that are not necessarily tagged as objects. However, a collection of points is considered to indicate the presence of an object. Thus, input data in the form of a LIDAR output may indirectly indicate the presence of an object in the form of a group of point detections (i.e., a point cloud). The input data therefore can comprise indirect evidence of objects. Input data in the form of processed camera images may directly indicate the presence of an object as that "input data" is post-processed with e.g., an object detection algorithm. Thus, input data can comprise direct evidence of objects. Similarly, a lack of object detections at a certain area can be construed as a presence of a free-space area in that area.

In some embodiments, the method comprises validating 105 an object detection indicated in the obtained perception output data for a sensor or subset of sensors in response to detecting an object (in the corresponding area/volume of the surrounding environment) being indicated in the field-of-view of that sensor or subset of sensors (i.e., indicated in the sensor data output of that sensor or subset of sensor). Accordingly, if an object detection is indicated in the obtained perception output data and if the stored sensor data directly or indirectly indicates a presence of an object in the same area or volume in the surroundings of the vehicle, then that object detection is validated.

Furthermore, in some embodiments, the method comprises validating 115 a free-space area indicated in the obtained perception output data for a sensor or subset of sensors in response to detecting a presence of a free-space area indication (in the corresponding area/volume of the surrounding environment) being indicated in the field-of-view of that sensor or subset of sensors. Accordingly, if a free-space detection is indicated in the obtained perception output data and if the stored sensor data of a sensor or subset of sensors indicates directly or indirectly a presence of a free-space area in the same area or volume in the surroundings of the vehicle, then that free-space area indication is validated.

In an illustrative example, the obtained perception output data may comprise object detections A, B, and C, and the vehicle may comprise sensors X, Y, and Z. The comparison 103 of the obtained perception output data with the stored input data may accordingly comprise determining whether any of the object detections A, B, and C are present in the stored sensor output from sensor X, if object detections A, B, and C are present in the stored sensor output from sensor Y, and if object detections A, B, and C are present in the stored sensor output from sensor Z. In an example scenario, object detection A may have been verified in the stored sensor output from sensors X and Z, while object detection B may have been verified in the stored sensor output from sensor Y, and object detection C may not have been verified in any of the stored sensor outputs. In such a scenario, object detections A and B would be verified object detections while object detection C would be a non-verified object detection.

Furthermore, the method comprises outputting 108 a signal indicative of a status of the sensor fusion system based on a measure of validated objects and a measure of validated free-space areas. The "measure" of validated objects may for example be a binary signal (validated—yes/no) and the "measure" of validated free-space areas may for example be a binary signal (validated—yes/no). Further details and examples related to the signal output 108 and the measures are described below in connection with FIG. 2 and FIG. 3.

Moreover, for each sensor or subset of sensors of the plurality of vehicle-mounted sensors, the measure of validated objects may be aggregated 107 over time. Similarly, the measure of validated free-space areas may be aggregated 117 over time. As a result, signal indicative of the status of the sensor fusion system based on the aggregated measure of validated objects for each sensor or subset of sensors and the aggregated measure of validated free-space areas for each sensor or subset of sensors is output 108. In some embodiments, the method 100 may comprise aggregating the measure of validated objects and free-space areas over time for the plurality of vehicle-mounted sensors.

Furthermore, the aggregated measure of validated objects may comprise a percentage of the objects validated for a sensor for a time period during which input data of that sensor is stored. Thus, in some embodiments, the method 100 may comprise for each sensor or subset of sensors of the plurality of vehicle-mounted sensors, determining 106 a percentage of objects detected in the obtained perception output data that are validated. Similarly, the aggregated measure of validated free-space areas may comprise a percentage of the free-space areas validated for a sensor for a time period during which input data of that sensor is stored. Thus, in some embodiments, the method 100 may comprise for each sensor or subset of sensors of the plurality of vehicle-mounted sensors, determining 116 a percentage of free-space areas detected in the obtained perception output data that are validated.

In some embodiments, an ADS function of the vehicle may be controlled 109 based on the output signal indicative of the status of the sensor fusion system. For example, if the output signal indicates that the output from the sensor fusion system is faulty or otherwise unreliable, then the controlling 109 of an ADS function may comprise inhibiting activation of ADS functions that rely on the output from the sensor fusion system. Analogously, if the output signal indicates that the output from the sensor fusion system is accurate or otherwise reliable, the controlling 109 of an ADS function may comprise allowing activation of ADS functions that rely on the output from the sensor fusion system. In some embodiments, the controlling 109 of an ADS function may comprise outputting a request for a hand-over to a driver of the vehicle and deactivation of the ADS function.

In accordance with some embodiments, the method 100 further comprises transmitting 110 data to a remote server via one or more antennas of the vehicle, where the transmitted data is indicative of the status of the sensor fusion system. An advantage of transmitting the data to a remote server (such as a central fleet management system) is that it enables and facilitates development, debugging and performance validation of the sensor fusion system. In more detail, it enables for fleet-wide monitoring and validation of the deployed sensor fusion systems of an entire fleet whereby potential widespread problems could be detected and mitigated at a faster pace. Moreover, performance validation for new software versions of the sensor fusion system may be enabled and facilitated.

Furthermore, executable instructions for performing these functions are, optionally, included in a non-transitory computer-readable storage medium or other computer program product configured for execution by one or more processors.

Figure 2:
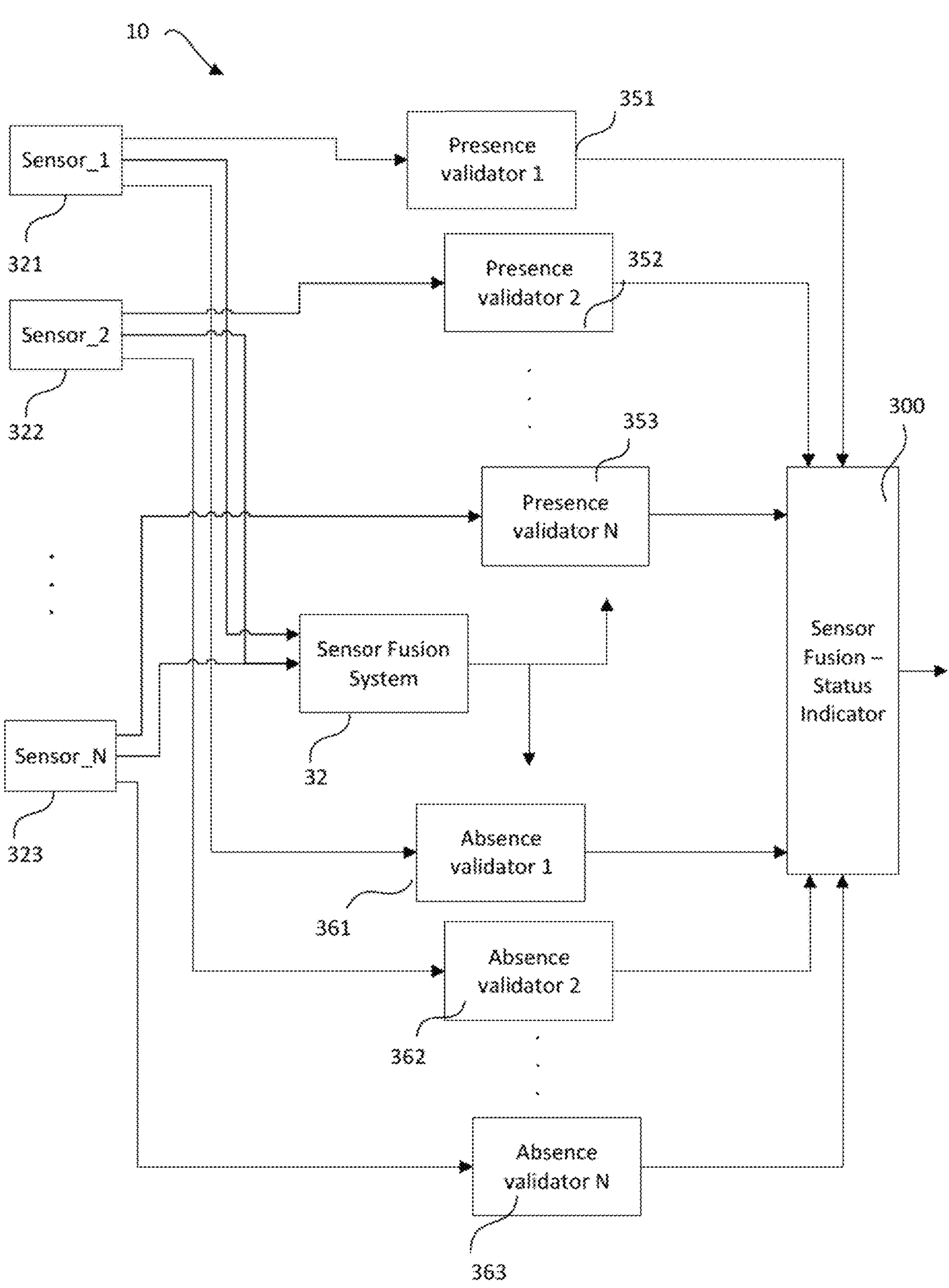
FIG. 2 is a schematic block diagram representation of a system for monitoring a reliability of an output of a sensor fusion system of a vehicle in accordance with some embodiments.
Figure 3:
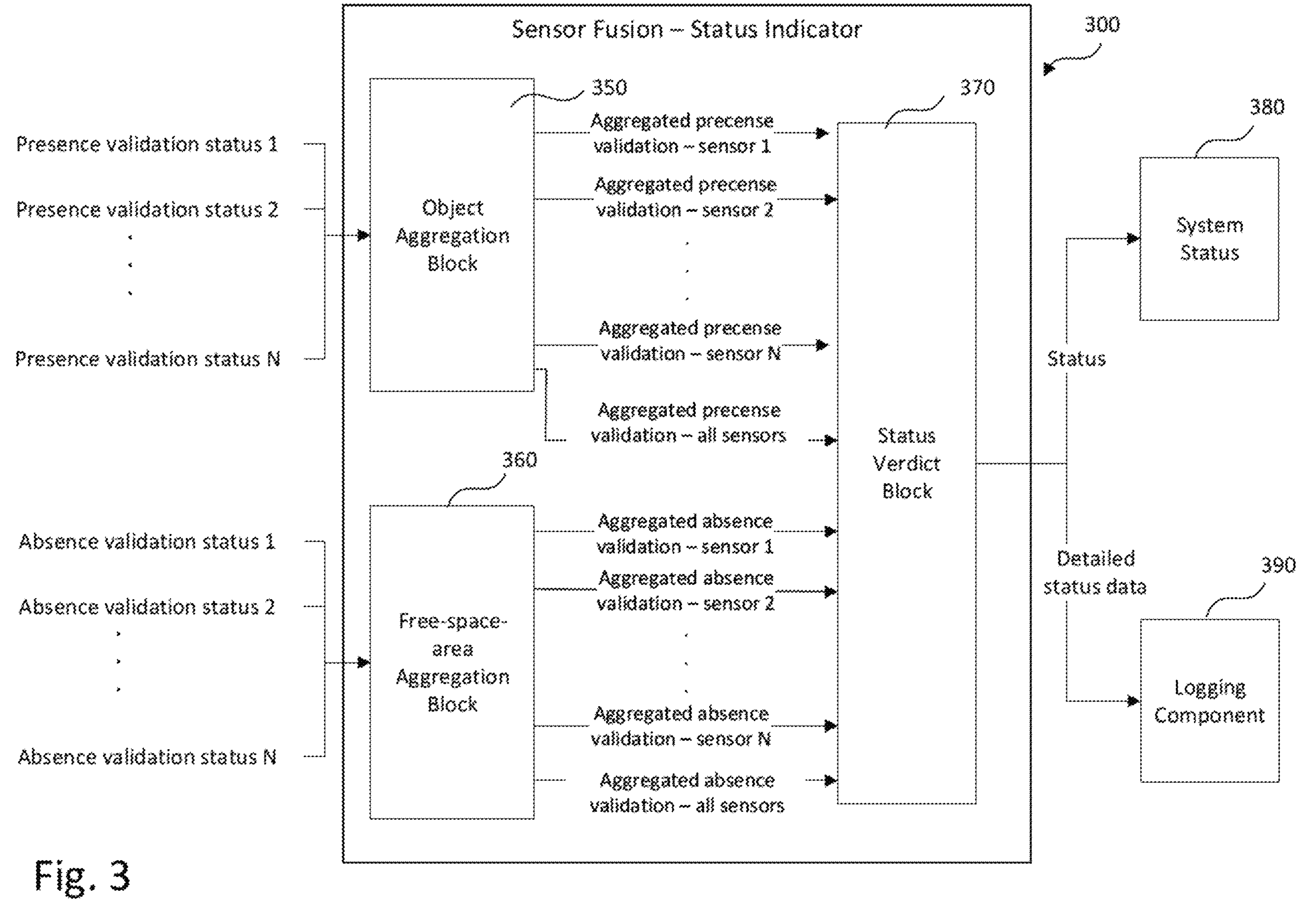
FIG. 3 is a schematic block diagram representation of a sensor fusion-status indicator in accordance with some embodiments.

FIGS. 2 and 3 are schematic block diagram representations of a system 10 (or parts thereof) for monitoring a reliability of an output of a sensor fusion system 32 of a vehicle in accordance with some embodiments. The system 10 comprises control circuitry (e.g. one or more processors) configured to perform the functions of the method 100 disclosed herein, where the functions may be included in a non-transitory computer-readable storage medium 12 or other computer program product configured for execution by the control circuitry 11. In other words, the system 10 comprises one or more memory storage areas 12 comprising program code, the one or more memory storage areas 12 and the program code configured to, with the one or more processors 11, cause the system 10 to perform the method 100 according to any one of the embodiments disclosed herein. However, in order to better elucidate the herein disclosed embodiments, the control circuitry is represented as various "modules" or blocks 351-353, 3361-363, 300, 350, 360, 370, 380. 390 in FIGS. 2 and 3, each of them linked to one or more specific functions of the control circuitry.

Accordingly, FIG. 2 shows a system 10 for monitoring a reliability of an output of a sensor fusion system 32 of a vehicle in accordance with some embodiments. The sensor fusion system 32 receives, as input data, the output from a plurality of sensors 321, 322, 323 mounted on the ego-vehicle. The system 10 is configured to store input data, wherein the input data comprises sensor data, obtained over a time period, from each of the plurality of vehicle-mounted sensors 321, 322, 323 configured to monitor a surrounding environment of the vehicle. The system is further configured to obtain perception output data that is output from the sensor fusion system 32 using the input data obtained over the time period from the plurality of vehicle-mounted sensors 321, 322, 323. The obtained perception output data comprises one or more object detections in the surrounding environment of the vehicle and one or more free-space area indications in the surrounding environment of the vehicle.

For each sensor 321, 322, 323 or subset of sensors, the system 10 is configured to compare the obtained perception output data with the stored input data and determine: whether any object detections indicated in the obtained perception output data is/are indicated in the field-of-view of that sensor or subset of sensors in order to validate any object detections indicated in the obtained perception output data, and whether any free-space area indications in the obtained perception output data is/are indicated in the field-of-view of that sensor or subset of sensors in order to validate any free-space area indicated in the obtained perception output data.

In some embodiments, the system 10 comprises two sets of modules. One set of modules is object presence validator blocks 351, 352, 353 comprising a plurality of presence validators 1, 2, . . . , N and configured to provide object presence validations, e.g., whether or not the object detections are validated for each of the sensors 321, 322, 323 or subset of sensors. Another set of modules is object absence validator blocks 361, 362, 363 comprising a plurality of object absence validators 1, 2, . . . , N and configured to provide object absence validations, i.e., whether or not the free-space areas are validated for each of the sensors 321, 322, 323 or subset of sensors. As depicted in FIG. 2, there may be as many presence validator blocks as the number of sensors.

Additionally or alternatively the sensors may be arranged in groups or subsets so that there is a presence validator for each group or subset of sensors. Similarly, there may be as many absence validator blocks as the number of sensors. Additionally or alternatively the sensors may be arranged in groups or "subsets" so that there is an absence validator for each subset of sensors.

Each presence validator block 351, 352, 353 is configured to compare an output of the sensor fusion system 32 at a certain time period or moment in time to a collection of that sensors input over time and decides whether a certain object that has been produced by the sensor fusion system 32 can be validated. That is, the presence of objects, e.g., object detections, in the output of the sensor fusion system 32 are validated by checking if there is enough evidence (in the sensor data) for the produced objects. For example, the output data of the sensor fusion system 32 and stored input data of a sensor 321, 322 or 323 or subset of sensors may be compared to assess whether both data indicate the presence of the same object. For example, presence validator_1 351 is configured to validate an object detection in the output of the sensor fusion system 32 by detecting an object detection in the corresponding area or location in the output of sensor_1 321. The output from each object presence validator block 351, 352, 353 may be a binary signal (e.g., 1/0) that is output for each object, where a 1 is output if an object is validated while a 0 is output if an object cannot be validated.

Similarly, if the sensor fusion system 32 outputs a free-space area (i.e., it does not produce an output representing an object in a certain area), the object absence validator blocks 361, 362, 363 are configured to check if this free-space area can be validated by the corresponding sensor output(s) (i.e., in the sensor data). Like object presence validation, the object absence validation, i.e., validation of free-space areas, may be done per sensor and/or per subset of sensors. For example, absence validator_1 361 is configured to validate a free-space area detection in the output of the sensor fusion system 32 by detecting a free-space area (i.e., an area absent of objects) in the corresponding area or location in the output of sensor_1 321. The output from each object absence validator block 361, 362, 363 may be a binary signal (e.g., 1/0) that is output for each object, where a 1 is output if a free-space area is validated while a 0 is output if a free-space area cannot be validated.

Furthermore, the system 10 is further configured to output a signal indicative of a status of the sensor fusion system 32 based on a measure of validated objects and a measure of validated free-space areas. This is indicated by the sensor fusion-status indicator block 300, which is configured to output the signal indicative of a status of the sensor fusion system based on the outputs from the presence validator blocks 351-353 and the absence validator blocks 361-363. Accordingly, the sensor fusion-status indicator block 300 ingests the output data of the presence validator blocks 351, 352, 353 and the absence validator blocks 361, 362, 363, and outputs a "status signal" based on the ingested output data from these validator blocks. The measure may comprise a binary value (i.e. verified or not verified) and/or an aggregate measure such as a percentage (i.e., the percentage of objects or free-space areas that are verified by a specific sensor). Further details related to the aggregated measure is provided below in reference to FIG. 3. Moreover, the measure may further comprise an associated time period or moment in time (i.e., at what time was the object/free-space area validated/not validated or at what time was the object detected that was validated/not validated).

FIG. 3 is a schematic block diagram representation of a sensor fusion-status indicator 300. In more detail, the status indicator 300 block may comprise an object aggregation block 350 configured to receive object presence validations from the object presence validator modules and a free-space-area aggregation block 360 configured to receive free-space validations from the object absence validator modules. Thus, the system may be configured to aggregate the measure of validated objects over time for each sensor or subset of sensors, and to aggregate the measure of validated free-space areas over time for each sensor or subset of sensors. Thus, the signal indicative of a status of the sensor fusion system 32 may be based on the aggregated measure of validated objects for each sensor or subset of sensors and the aggregated measure of validated free-space areas for each sensor or subset of sensors.

In more detail, the object aggregation block 350 may be configured to aggregate the output from presence validators of each sensor or subset of sensors. For example, presence validation status for each individual sensor or each individual subset of sensors is checked in the object aggregation block 350 in order to output an aggregated measure of validated objects over time for each sensor or subset of sensors. In the depicted examples of FIG. 3, for each sensor_i, the signal "aggregated presence validation sensor_i" may be a binary signal indicating if this sensor_i validated more than a defined percentage, e.g., more than T % of output objects that are in the field-of-view of that sensor_i. Here, T is a threshold that can be set in agreement with the requirements of the sensor fusion system 32 or for the ADS function that consumes the output of the sensor fusion system 32.

Accordingly, each output signal from the object aggregation block 350 may be a binary signal (i.e. a 1 or a 0) for each sensor, where the output signal from the object aggregation block 350 for sensor_i, is 1 if said sensor validates more than T % (e.g., 80%, 90%, 95%, 99%, etc.) of the sensor fusion system's object detections that are in the field-of-view of that sensor. Similarly, the output signal from the object aggregation block 350 for sensor_i is 0 if that sensor validates less than T % (e.g., 80%, 90%, 95%, 99%, etc.) of the sensor fusion system's object detections that are in the field-of-view of that sensor. The measure (upon which the sensor fusion status signal is based) may accordingly be a binary signal. However, in some embodiments, the object aggregation block is configured to output an aggregated measure of validated objects over time in the form of a percentage value for each sensor or subset of sensors. Thus, the output from the object aggregation block 350 may comprise, for each sensor, a binary value, a percentage or a combination of a binary value and a percentage of object detections that are validated by that sensor. The output from the object aggregation block 350 may further comprise, for each sensor, a related time period or moment in time (timestamp).

Analogously, free-space area aggregation block 360 may be configured to aggregate the output from absence validators of each sensor or subset of sensors. For example, absence validation status for each individual sensor or each individual subset of sensors is checked in the free-space area aggregation block 360 in order to output an aggregated measure of validated free-space areas over time for each sensor or subset of sensors. In the depicted examples of FIG. 3, for each sensor_i, the signal "aggregated absence validation sensor_i" may be a binary signal indicating if this sensor_i validated more than a defined percentage, e.g., more than S % of output free-space areas that are in the field-of-view of that sensor_i. Here, S is a threshold that can be set in agreement with the requirements of the sensor fusion system 32 or for the ADS function that consumes the output of the sensor fusion system 32. Accordingly, each output signal from the free-space area aggregation block 360 may be a binary signal (i.e. a 1 or a 0) for each sensor, where the output signal from the free-space area aggregation block 360 for sensor_i, is 1 if said sensor validates more than S % (e.g., 80%, 90%, 95%, 99%, etc.) of the sensor fusion system's free-space area detections that are in the field-of-view of that sensor. Similarly, the output signal from the free-space area aggregation block 360 for sensor_i is 0 if that sensor validates less than S % (e.g., 80%, 90%, 95%, 99%, etc.) of the sensor fusion system's free-space area detections that are in the field-of-view of that sensor. The measure (upon which the sensor fusion status signal is based) may accordingly be a binary signal. However, in some embodiments, the free-space area aggregation block 360 is configured to output an aggregated measure of validated free-space areas over time in the form of a percentage value for each sensor or subset of sensors. Thus, the output from the free-space area aggregation block 360 may comprise, for each sensor, a binary value, a percentage or a combination of a binary value and a percentage of object detections that are validated by that sensor. The output from the free-space area aggregation block 360 may further comprise, for each sensor, a related time period or moment in time (timestamp).

In reference to the aforementioned percentage thresholds T and S, for any sensor fusion system, there may be different requirements between the tolerance of false negatives and false positives, and this difference may be considered as feature-dependent (i.e. ADS-function dependent). For example, for an ADS function that controls the movement of the vehicle and that consumes the output from the sensor fusion system, a critical goal for that ADS function is that the vehicle must not collide with objects, which puts strict requirements on false negatives from the sensor fusion system. A false positive, on the other hand, might not be as problematic since the ADS function will then drive with, potentially unnecessary, caution. A false negative in this case would be that the sensor fusion system outputs a free-space area at a location where there is an object (i.e., it misses an object), while a false positive is where the sensor fusion system outputs an object at a location where there is no object. In the present context the false negatives may be detected as non-validated free-space areas, while false positives may be detected as non-validated object detections. Thus, for an ADS function that controls the movement of the vehicle and that consumes the output from the sensor fusion system, the aforementioned threshold S (related to free-space area validations) could be set more strictly (i.e. at a higher percentage value) than threshold T (related to object validations).

Moreover, in some embodiments, the object aggregation block 350 may be configured to aggregate the measure of validated objects over time for the plurality of vehicle-mounted sensors. In other words, the system may be configured to aggregate the measure of validated objects over time for the plurality of vehicle-mounted sensors. Similarly, the free-space area aggregation block 360 may be configured to aggregate the measure of validated free-space areas over time for the plurality of vehicle-mounted sensors. The measure of validated objects and free-space areas may be aggregated for all the sensors contributing to the perception output data. The output signal indicative of the status of the sensor fusion system may therefore be based on the aggregated measure of validated objects for the plurality of vehicle-mounted sensors and the aggregated measure of validated free-space areas for the plurality of vehicle-mounted sensors.

This implies that another output producible by the object aggregation block 350 and the free-space-area aggregation block 360 may be "aggregated presence validation-all sensors" and "aggregated absence validation-all sensors", respectively. Specifically, the object aggregation block 350 may further output the percentage of the sensors, among all sensors, that are validating the presence of the objects and assess whether more than a certain percentage of the sensors are validating more than a certain percentage of the objects. The goal could for example be to indicate if a sizeable percentage of the sensor fusion system output cannot be validated by any (or a large number of) sensors. Moreover, the free-space-area aggregation block 360 may further output "aggregated absence validation of all sensors", indicating if a considerable number of the free-space areas cannot be validated as free-space areas by many sensors. This would indicate that the sensor fusion system is failing to detect/report a sizeable number of objects according to a majority of the sensors.

The sensor fusion-status indicator 300 block may further comprise a status verdict block 370. The status verdict block 370 is configured to evaluate the status of the sensor fusion system based on thresholds for the aggregated measure of validated objects and the aggregated measure of validated free-space areas and further based on the input provided by the object aggregation block 350 and free-space-area aggregation block 360. Moreover, the status verdict block 370 may be configured to output two types of output signal, namely, status and detailed status data. The output signal indicates the status of the sensor fusion system. The status may be the system status 380, which is any output signaling whether the output of the sensor fusion system is reliable, such as whether or not the sensor fusion system functions satisfactorily or not. The status may be output based on a binary value. The status may also be detailed status data comprising per-sensor and per-zone statistics which may be logged by a logging component 390 and used further for example for debug purposes. Advantageously, an ADS function of the vehicle may be controlled based on the output signal indicative of the status of the sensor fusion system. As disclosed herein, the ADS comprises an ADS feature (may also be referred to as ADS function) that is preferably a level 3 feature or higher according to SAE J3016 levels of driving automation for on-road vehicles. The ADS feature may for example be a traffic jam pilot, a highway pilot, or any other SAE J3016 level 3+ ADS feature. The controlling of ADS may for example include disabling the sensor fusion system-and thereby inhibiting activation of any ADS function reliant on the input from the sensor fusion system. Moreover, the controlling of the ADS may comprise deactivating any ADS function reliant upon the sensor fusion system.

Figure 4:
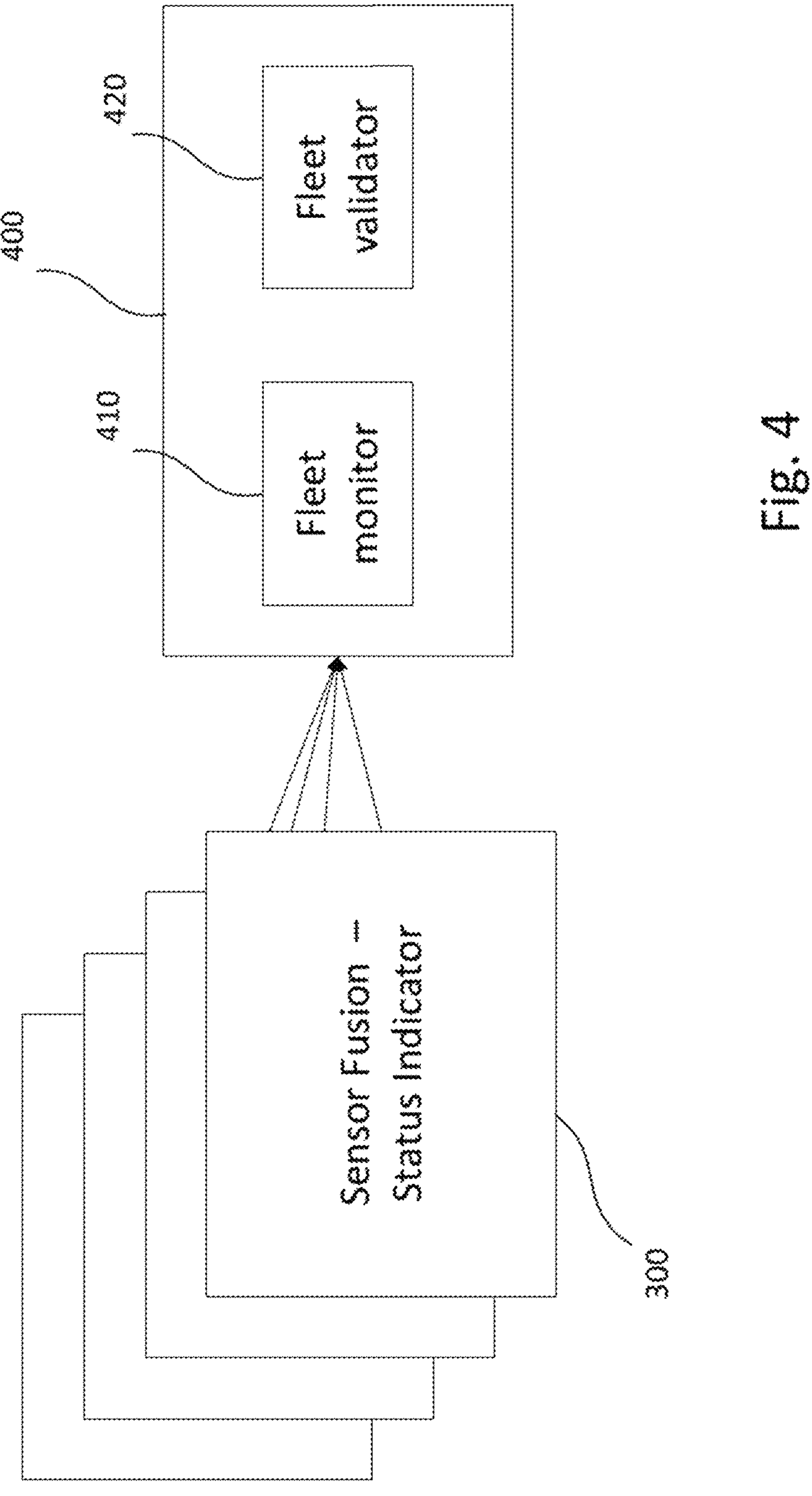
FIG. 4 is a schematic block diagram representation of a sensor fusion-status indicator in accordance with some embodiments.

Moreover, in some embodiments the system 10 may be configured to transmit data to a remote server 400 via one or more antennae of the vehicle. More specifically, the transmitted data is indicative of the status of the sensor fusion system. Accordingly, in addition to the local monitoring of the reliability of an output of the sensor fusion system of an individual vehicle, the status indicator of each vehicle may be transmitted from the vehicle to a remote entity 400 where the status indicators may be consolidated across an entire fleet of vehicles. The "remote entity" may in the present context be understood as a central entity responsible for the management and maintenance of the ADSs deployed in the vehicle fleet. FIG. 4 is a schematic block diagram representation illustrating how the output of the sensor fusion-status indicator 300 may be directed from several vehicles to a data centre where further evaluation and validation may be performed in accordance with some embodiments. The output of the sensor fusion-status indicator 300 may be sent to the data centre for use to monitor 410 the fleet and detect wide-spread problems as well as validate 420 performance of the fleet, such as large-scale validation of the sensor fusion system.

Figure 5:
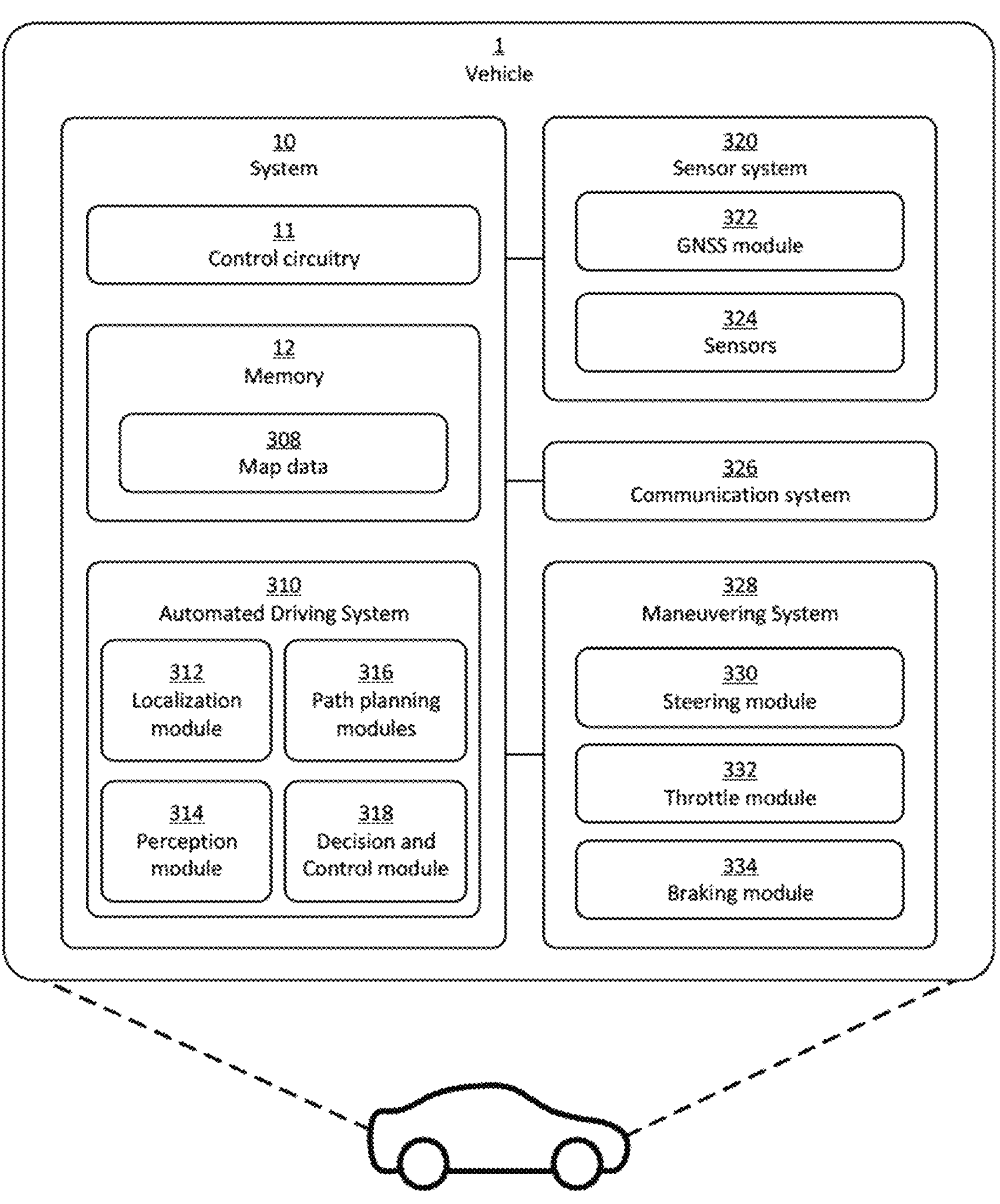
FIG. 5 is a schematic diagram of a vehicle comprising a system for monitoring a reliability of an output of a sensor fusion system of the vehicle in accordance with some embodiments.

Moving on, FIG. 5 is a schematic illustration of an ADS-equipped vehicle 1 comprising a system 10 for monitoring a reliability of an output of a sensor fusion system of a vehicle in accordance with some embodiments. As used herein, a "vehicle" is any form of motorized transport. For example, the vehicle 1 may be any road vehicle such as a car (as illustrated herein), a motorcycle, a (cargo) truck, a bus, etc.

The system 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g. the ADS 310). Moreover, the system 10 may form a part of the ADS 310, i.e. the system 10 may be implemented as a module or feature of the ADS. The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random-access memory, such as DRAM, SRAM, DDR RAM, or other random-access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

In the illustrated example, the memory 12 further stores map data 308. The map data 308 may for instance be used by the ADS 310 of the vehicle 1 in order to perform autonomous functions of the vehicle 1. The map data 308 may comprise high-definition (HD) map data. It is contemplated that the memory 12, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 11 may be distributed e.g. such that one or more processors of the control circuitry 11 is provided as integral elements of the ADS 310 or any other system of the vehicle 1. In other words, according to an exemplary embodiment, any distributed or local control circuitry device may be utilized in the realization of the present inventive concept. The ADS 310 is configured carry out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 may have any combination of the various elements shown in FIG. 5. Moreover, the vehicle 1 may comprise further elements than those shown in FIG. 5. While the various elements are herein shown as located inside the vehicle 1, one or more of the elements may be located externally to the vehicle 1. For example, the map data may be stored in a remote server and accessed by the various components of the vehicle 1 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 5 should be seen merely as an illustrative example, as the elements of the vehicle I can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 1. The sensor system 320 may further comprise one or more sensors 324. The sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 1.

The vehicle 1 further comprises a communication system 326. The communication system 326 is configured to communicate with external units, such as other vehicles (i.e. via vehicle-to-vehicle (V2V) communication protocols), remote servers (e.g. cloud servers), databases or other external devices, i.e. vehicle-to-infrastructure (V2I) or vehicle-to-everything (V2X) communication protocols. The communication system 318 may communicate using one or more communication technologies. The communication system 318 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g. remote operator or control center) and/or to receive input from a remote location by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 1 further comprises a maneuvering system 320. The maneuvering system 328 is configured to control the maneuvering of the vehicle 1. The maneuvering system 328 comprises a steering module 330 configured to control the heading of the vehicle 1. The maneuvering system 328 further comprises a throttle module 332 configured to control actuation of the throttle of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e. from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g. comprised in one or more electronic control modules and/or nodes of the vehicle 1, adapted and/or configured to interpret sensory data—relevant for driving of the vehicle 1—to identify e.g. obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data e.g. from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

Specifically, the vehicle 1 of the present disclosure comprises a system 10 for monitoring a reliability of an output of a sensor fusion system of a vehicle, wherein the sensor fusion system is configured to receive input data and generate perception output data. The system 10 comprises one or more memory storage areas comprising program code, the one or more memory storage areas and the program code being configured to, with the one or more processors, cause the system 10 to at least store input data of the sensor fusion system, wherein the input data comprises sensor data, obtained over a time period, from each of a plurality of vehicle-mounted sensors configured to monitor a surrounding environment of the vehicle. Furthermore, the program code is configured to cause the system 10 to obtain perception output data that is output from the sensor fusion system using the input data obtained over the time period, the obtained perception output data comprising one or more object detections in the surrounding environment of the vehicle and one or more free-space area indications in the surrounding environment of the vehicle. Moreover, for each sensor or subset of sensors of the plurality of vehicle-mounted sensors, the system 10 compares the obtained perception output data with the stored input data and determining: whether any object detections indicated in the obtained perception output data is/are indicated in the field-of-view of that sensor or subset of sensors in order to validate any object detections indicated in the obtained perception output data; whether any free-space area indications in the obtained perception output data is/are indicated in the field-of-view of that sensor or subset of sensors in order to validate any free-space area indicated in the obtained perception output data. Finally, the system 10 outputs a signal indicative of a status of the sensor fusion system based on a measure of validated objects and a measure of validated free-space areas.

Moreover, the one or more memory storage areas and the program code may be configured to cause the system to at least perform any of the functions of the method 100 disclosed herein. For example, the one or more memory storage areas and the program code may be configured to cause the system to at least control an ADS function of the vehicle based on the output signal indicative of the status of the sensor fusion system.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system may be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The system 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor (e.g., via a circuit or any other wired, wireless, or network connection) and includes computer code for executing one or more processes described herein.

It should be noted that any reference signs do not limit the scope of the claims, that the embodiments disclosed herein may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various processing steps, comparison steps and decision steps. The above mentioned and described embodiments are only given as examples and should not be limiting to the present invention. Other solutions, uses, objectives, and functions within the scope of the invention as claimed in the below described patent claims should be apparent for the person skilled in the art.

It should be noted that, the term "if" may be construed to mean "when or "upon" or "in response to determining or "in response to detecting" depending on the context. Similarly, the phrase "if it is determined' or "when it is determined" or "in an instance of" may be construed to mean "upon determining or "in response to determining" or "upon detecting and identifying occurrence of an event" or "in response to detecting occurrence of an event" depending on the context.

The invention claimed is:

1. A computer-implemented method for monitoring a reliability of an output of a sensor fusion system of a vehicle, wherein the sensor fusion system is configured to receive input data and generate perception output data, the method comprising:

storing input data of the sensor fusion system, wherein the input data comprises sensor data, obtained over a time period, from each of a plurality of vehicle-mounted sensors configured to monitor a surrounding environment of the vehicle;

obtaining perception output data that is output from the sensor fusion system using the input data obtained over the time period, the obtained perception output data comprising one or more object detections in the surrounding environment of the vehicle and one or more free-space area indications in the surrounding environment of the vehicle;

for each sensor or subset of sensors of the plurality of vehicle-mounted sensors:

comparing the obtained perception output data with the stored input data and determining:

whether any object detections indicated in the obtained perception output data is indicated in a field-of-view of that sensor or subset of sensors in order to validate any object detections indicated in the obtained perception output data, and whether any free-space area indications in the obtained perception output data is indicated in the field-of-view of that sensor or subset of sensors in order to validate any free-space area indicated in the obtained perception output data;

outputting a signal indicative of a status of the sensor fusion system based on a measure of validated objects and a measure of validated free-space areas; and controlling an Automated Driving System (ADS) function of the vehicle based on the output signal indicative of the status of the sensor fusion system.

2. The method according to claim 1, further comprising:

for each sensor or subset of sensors of the plurality of vehicle-mounted sensors:

determining a percentage of objects detected in the obtained perception output data that are validated, and determining a percentage of free-space areas detected in the obtained perception output data that are validated; and wherein the measure of validated objects comprises the percentage of detected objects in the perception output data that are validated, and the measure of validated free-space areas comprises the percentage of free-space areas detected in the perception output data that are validated.

3. The method according to claim 1, wherein the sensor fusion system is an object tracking system configured to track a position of objects present in the input data over time.

4. The method according to claim 1, wherein the storing input data comprises separately storing each dataset of the input data in a respective sensor-specific or subset-specific data storage.

5. The method according to claim 1, further comprising:

for each sensor or subset of sensors of the plurality of vehicle-mounted sensors:

in response to detecting an object detection indicated in the obtained perception output data being indicated in the field-of-view of that sensor or subset of sensors:

validating that object detection indicated in the obtained perception output data for that sensor or subset of sensors.

6. The method according to claim 1, further comprising:

for each sensor or subset of sensors of the plurality of vehicle-mounted sensors:

in response to detecting a presence of a free-space area indication in the obtained perception output data being indicated in the field-of-view of that sensor or subset of sensors:

validating that free-space area indicated in the obtained perception output data for that sensor or subset of sensors.

7. The method according to claim 1, further comprising:

for each sensor or subset of sensors of the plurality of vehicle-mounted sensors:

aggregating the measure of validated objects over time, and aggregating the measure of validated free-space areas over time;

wherein the output signal indicated of the status of the sensor fusion system is based on the aggregated measure of validated objects for each sensor or subset of sensors and the aggregated measure of validated free-space areas for each sensor or subset of sensors.

8. The method according to claim 1, further comprising:

aggregating the measure of validated objects over time for the plurality of vehicle-mounted sensors, and aggregating the measure of validated free-space areas over time for the plurality of vehicle-mounted sensors;

wherein the output signal indicated of the status of the sensor fusion system is further based on the aggregated measure of validated objects for the plurality of vehicle-mounted sensors and the aggregated measure of validated free-space areas for the plurality of vehicle-mounted sensors.

9. The method according to claim 1, further comprising:

transmitting data to a remote server via one or more antennas of the vehicle, the transmitted data being indicative of the status of the sensor fusion system.

10. A non-transitory computer-readable storage medium storing instructions which, when executed by a computing device of a vehicle, causes the computing device to carry out the method according to claim 1.

11. A system for monitoring a reliability of an output of a sensor fusion system of a vehicle, wherein the sensor fusion system is configured to receive input data and generate perception output data, the system comprising one or more memory storage areas comprising program code, the one or more memory storage areas and the program code being configured, when executed by one or more processors, to cause the system to at least:

store input data of the sensor fusion system wherein the input data comprises sensor data, obtained over a time period, from each of a plurality of vehicle-mounted sensors configured to monitor a surrounding environment of the vehicle;

obtain perception output data that is output from the sensor fusion system using the input data obtained over the time period, the obtained perception output data comprising one or more object detections in the surrounding environment of the vehicle and one or more free-space area indications in the surrounding environment of the vehicle;

for each sensor or subset of sensors of the plurality of vehicle-mounted sensors:

compare the obtained perception output data with the stored input data and determine:

whether any object detections indicated in the obtained perception output data is indicated in a field-of-view of that sensor or subset of sensors in order to validate any object detections indicated in the obtained perception output data, and whether any free-space area indications in the obtained perception output data is indicated in the field-of-view of that sensor or subset of sensors in order to validate any free-space area indicated in the obtained perception output data;

output a signal indicative of a status of the sensor fusion system based on a measure of validated objects and a measure of validated free-space areas, and control an ADS function of the vehicle based on the output signal indicative of the status of the sensor fusion system.

12. A vehicle comprising a system according to claim 11.

* * * * *